(12) United States Patent
Lohse

(10) Patent No.: US 6,701,125 B1
(45) Date of Patent: *Mar. 2, 2004

(54) METHOD FOR DEVELOPING A FLEXIBLE AND EFFICIENT EDUCATIONAL SYSTEM

(76) Inventor: Jesper Lohse, Asnaesgade 1, 2. left, DK-2200 Copenhagen N (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/600,362

(22) PCT Filed: Jan. 21, 1999

(86) PCT No.: PCT/DK99/00029

§ 371 (c)(1), (2), (4) Date: Sep. 14, 2000

(87) PCT Pub. No.: WO99/38139

PCT Pub. Date: Jul. 29, 1999

(30) Foreign Application Priority Data

Jan. 21, 1998 (DK) .......................................... 1998/00730

(51) Int. Cl.⁷ ................................................. G09B 3/00

(52) U.S. Cl. ...................... 434/350; 434/322; 434/362; 434/118

(58) Field of Search ................................ 434/118, 219, 434/307 R–308, 322, 323, 335, 336, 365, 350, 351, 362, 432; 705/32, 50–59; 725/32, 74, 82, 85, 93, 100, 114, 116, 131, 139; 360/69, 78.04, 135, 60, 132; 340/825.52; 369/47.11, 53.21; 379/93.01, 93.12, 102.01; 370/400, 490; 709/221; 707/500.1; 713/183; 717/11

(56) References Cited

U.S. PATENT DOCUMENTS

| 4,562,495 A | * 12/1985 | Bond et al. | .............. 360/78.04 |
| 4,823,210 A | * 4/1989 | Bond | .......................... 360/60 |

(List continued on next page.)

FOREIGN PATENT DOCUMENTS

| EP | 710943 | 5/1996 |
| WO | WO-93/21618 | 10/1993 |

(List continued on next page.)

*Primary Examiner*—Joe H. Cheng
(74) *Attorney, Agent, or Firm*—Harness, Dickey & Pierce, P.L.C.

(57) ABSTRACT

Method for developing a flexible and efficient educational system in a computer environment, with the opportunity to protect instructions and data. An educational system consists of multiple program elements, composed by program elements from both a user computer device and possibly program elements from a server computer or other sending devices, such as those computers, represented on the Internet. All elements of the program is managed using instruction sets which exit's on the user's computer device or are being sent from a server or other sending device. The instruction sets are divided into groups by topics, which for example relate to "overview map", "self-study", "lecture", "assignment preparation" and "group collaboration" plus "browse". Using the instruction sets, an electronic educational process can be developed, which is very much similar to a normal educational process. The instruction sets and data can be protected against being copied, which provides the supplier of an educational program protection against copying of the educational system. The advantage of the educational system is primarily that educational programs can be executed in a concentrated environment with frequently and improved execution with rapid search times, where search in large quantities of data can be avoided, as it is known with searches on the Internet.

7 Claims, 4 Drawing Sheets

U.S. PATENT DOCUMENTS

Figure 1:
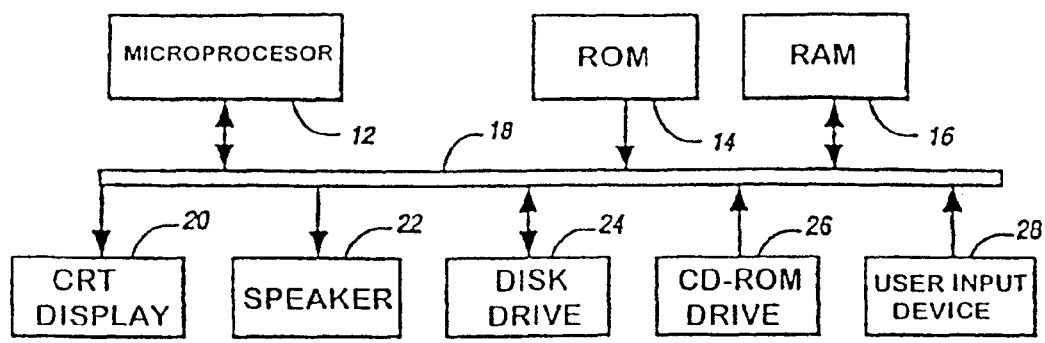

| | | | |
|---|---|---|---|
| 4,918,690 A | * 4/1990 | Markkula, Jr. et al. | 370/400 |
| 5,295,836 A | 3/1994 | Ryu et al. | |
| 5,318,450 A | 6/1994 | Carver | |
| 5,473,584 A | * 12/1995 | Oshima | 369/47.11 |
| 5,484,293 A | 1/1996 | Ford et al. | |
| 5,495,411 A | * 2/1996 | Ananda | 705/32 |
| 5,509,070 A | * 4/1996 | Schull | 705/54 |
| 5,528,281 A | 6/1996 | Grady et al. | |
| 5,537,141 A | 7/1996 | Harper et al. | |
| 5,548,645 A | * 8/1996 | Ananda | 705/52 |
| 5,684,952 A | 11/1997 | Stein | |
| 5,823,788 A | 10/1998 | Lemelson et al. | |
| 5,861,881 A | 1/1999 | Freeman et al. | |
| 6,162,060 A | * 12/2000 | Richard et al. | 434/118 |

FOREIGN PATENT DOCUMENTS

| | | |
|---|---|---|
| WO | WO-95/24796 | 9/1995 |
| WO | WO-95/28804 | 10/1995 |
| WO | WO-96/03734 | 2/1996 |
| WO | WO-97/27572 | 7/1997 |

* cited by examiner

METHOD FOR DEVELOPING A FLEXIBLE AND EFFICIENT EDUCATIONAL SYSTEM

This is the national phase under 35 U.S.C. §371 of PCT International Application No. PCT/DK99/00029 which has an International filing date of Jan. 21, 1999, which designated the United States of America, and Denmark Patent document PA 1998/0073, filed Jan. 21, 1998.

The invention describes a method for developing a flexible and efficient ted educational system with the opportunity to protect instructions and data, or ted systems alike in a computer environment consisting of a network of user and computer devices, as for example computer devices connected to the Internet or other ending/receiving devices, such as CD-ROM, network computers, interactive television etc.

Systems of the above mentioned type are for example known from U.S. Pat. No. 5,484,293, U.S. Pat. No. 5,537,141, U.S. Pat. No. 5,528,281, U.S. Pat. No. 684,952 and U.S. Pat. No. 5,318,450, which illustrates educational systems connected through a network.

Educational systems, which use direct access to for example the Internet, easily out of control for the user of the system. This is not at least due to the large s of data being distributed by networks like the Internet, where the user normally—as being connected to for example the Internet—begins to zap or "surf" around. The consequence is that the educational situation becomes unstructured and it means that the only obtains an overall introduction to the course.

It is furthermore a well-known case with for example the Internet, that on sets and data cannot optionally by the sending part be protected against printing, copying of a given object.

Besides that the Internet and other computer networks is able to deliver large quantities of data, it is also a well-known situation that the distribution of data might be time-consuming, especially at certain times, where a large number of users are connected. This puts into perspective, that the instructions used for handling data sometimes are being executed as function expressions, which like data are being distributed through the Internet and computer networks alike, thereby contributing to an, at certain times unacceptable "large traffic" on the Internet.

It is the purpose of the invention to provide an educational course, which ensures that the user of an educational system is offered the necessary data, represented in a manageable way with the lowest possible time delays when distributing data, and that the user optionally is able to protect instructions and data in the form of a given object against printing and copying.

The purpose of the invention is enabled by the system comprising instruction sets, stored in a user computer device, server computer or other type of sending device, and which can both be distributed in total or partly separated from data, or together with data, while the instruction sets are used to manage both data being distributed from server computer devices and/or other sending devices and data being stored in the user computer devices.

In this way a method is created for developing an educational system in a computer environment, where it is possible in a controllable way to distribute data, of relevance for a course. At the same time, the instruction sets ensure that only relevant data is being distributed either from the user computer device or from, for example the Internet.

The method is characterized by, the instruction sets being user specified and stored in the users computer device in a way such that the opportunity of copying instruction sets and data optionally can be prevented.

An advantage of using such an approach is that the supplier of an educational system is able to develop static structures of instructions related to individual courses and which cannot be copied, while at the same time preventing the educational system and course content to be pirate copied which would result in a loss for the supplier.

Copying is a key issue in general in the area of electronic distribution and commerce.

A suitable method of developing an educational system is that the instructions sets are related to managing and executing educational topics, such as "overview map", "self-study", "lecture", "group collaboration", "browse" and "general instructions".

This method of separating the instruction sets primarily has the advantage, that development of courses with different contents to some extent becomes standardized, thereby minimizing the cost of developing different courses to the lowest possible extent.

To further enable the best possible course structure, it is an advantage that the instruction sets are organized for creating, editing, administrating, analyzing and use of a total knowledge transformation process In this way all aspects of an educational situation are procured in an easy way.

For further transformation of th e "real life" educational situation to an educational situation in a computer environment, it is suitable that the topics are being presented as multimedia objects based on integration of one or more information types, such as a video, a series of sounds and pictures, a series of slides, a text, a graphic or a sound program.

While, as mentioned above, th e topics are presented as multimedia objects, the invention is further flexible by presenting these as a dialog between one or more users and the multimedia object, or as a dialog between one or more users through the multimedia object.

If multiple persons whishes to use an educational system in a computer environment, it is an advantage that multiple users at the same time are able to connect to educational programs. The flexibility and efficiency of the educational system is also increased if only data in the form of content, for example educational content, which is related to static function expressions, such as an index, is distributed from server computers or other sending devices.

This primarily provides the advantage, that the data, which for example exists on the Internet, can be distributed in an especially suitable way, if the function related expressions, which are related to the specific data, are being controlled by the instruction sets.

Finally it is an advantage that during execution of the educational program data is frequently updated from server computer devices or other sending devices.

This ensures that the supplied course system is always fully updated with the latest knowledge.

Figure 2:
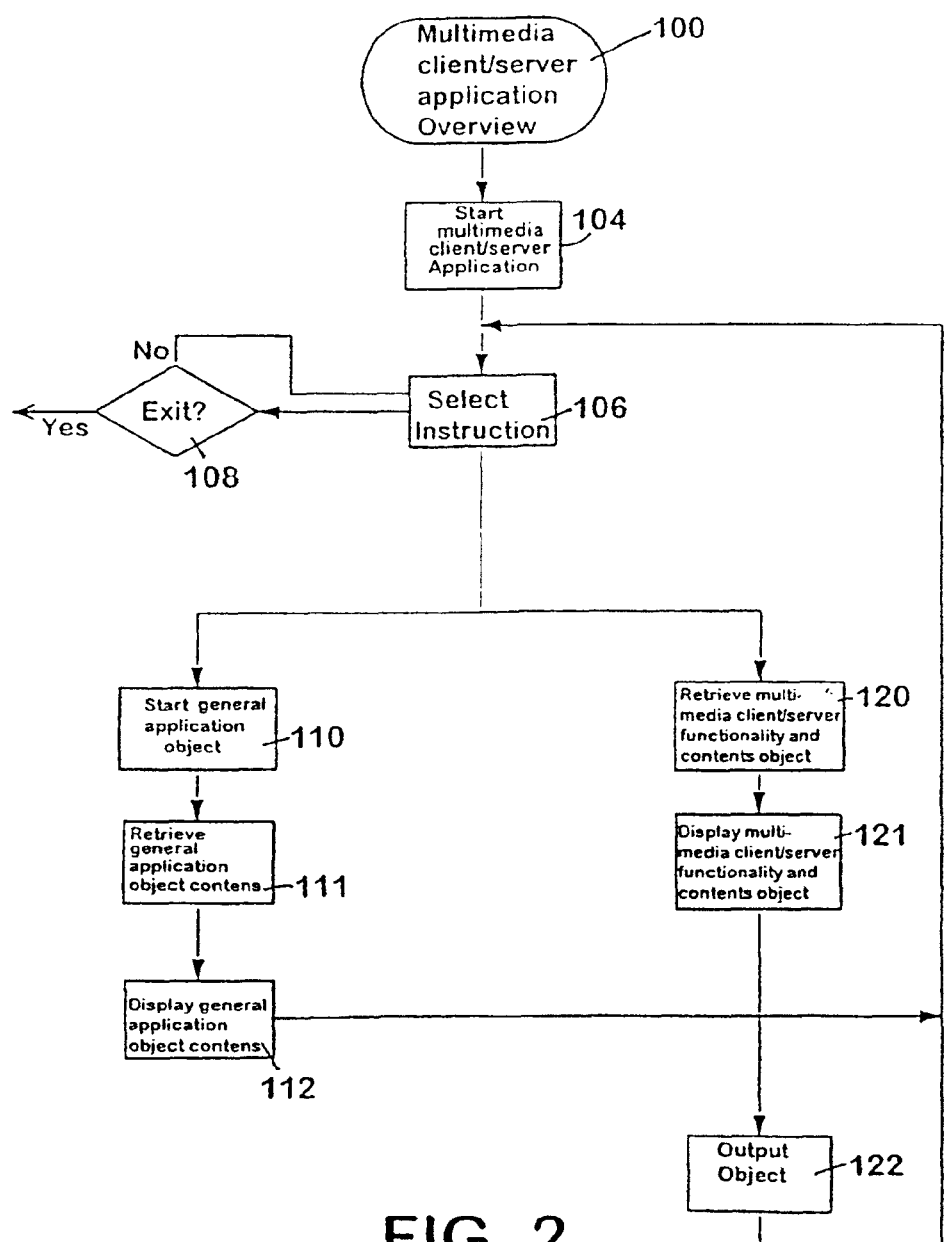
Figure 3:
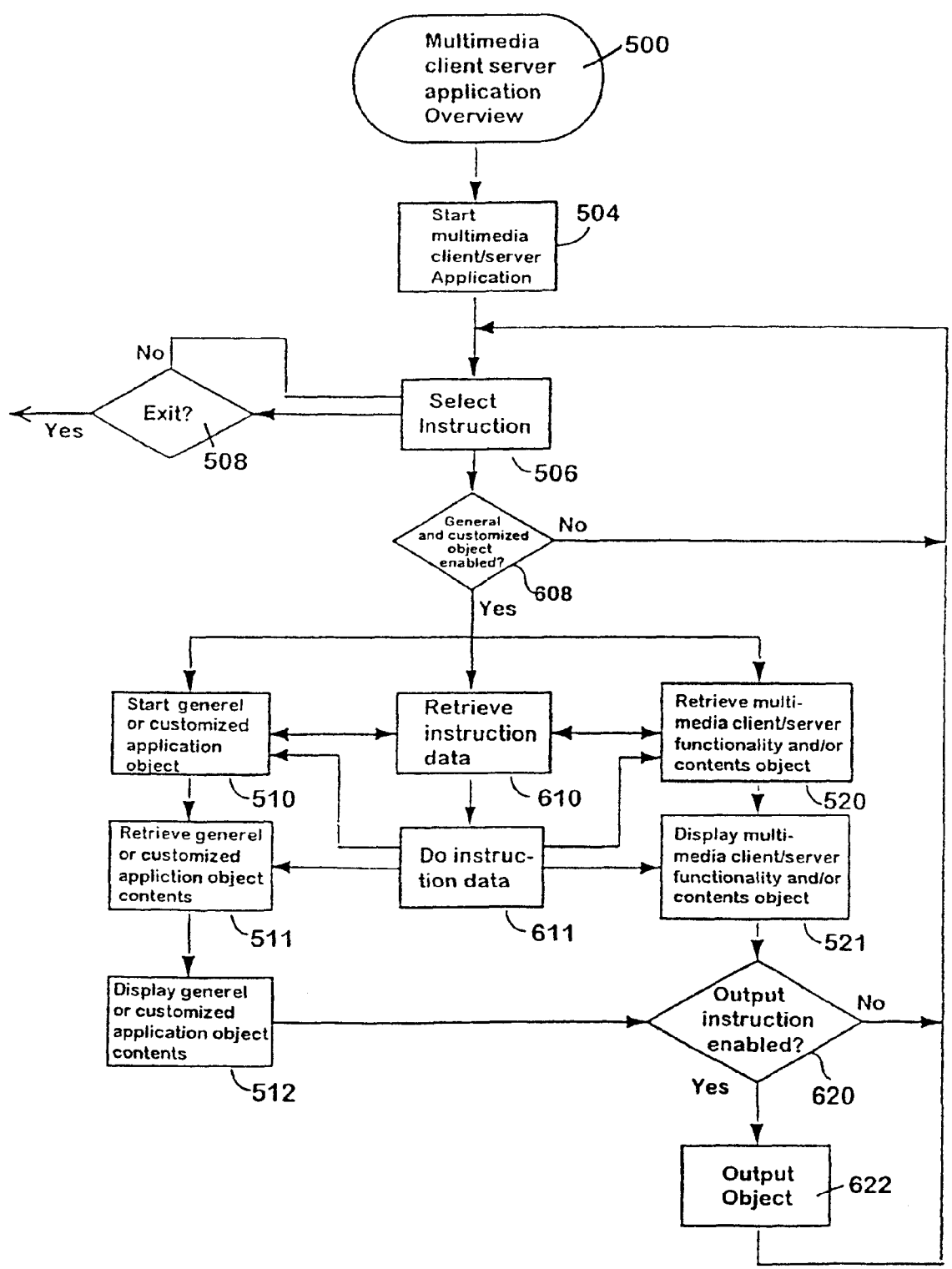
Figure 4:
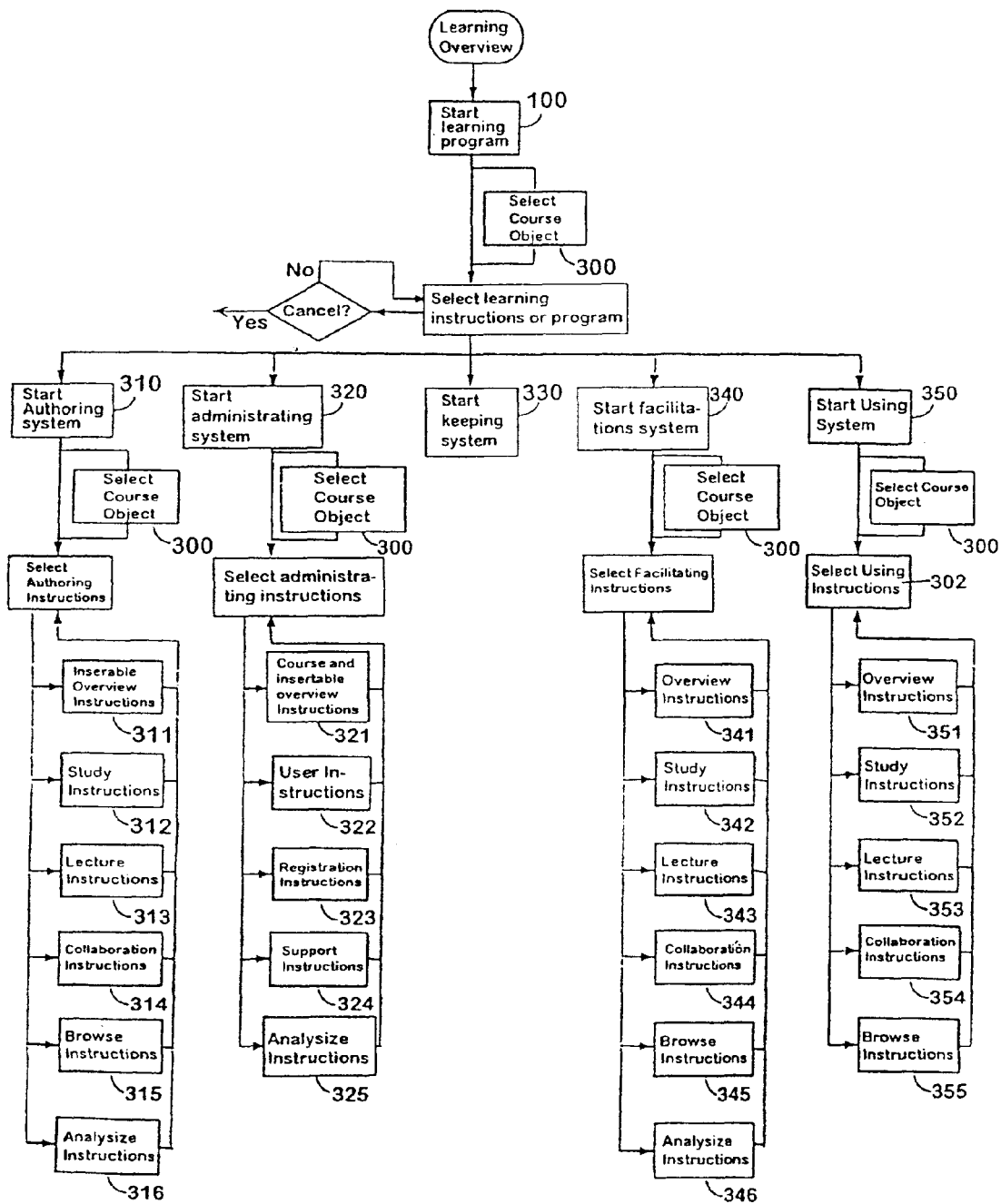
Figure 5:
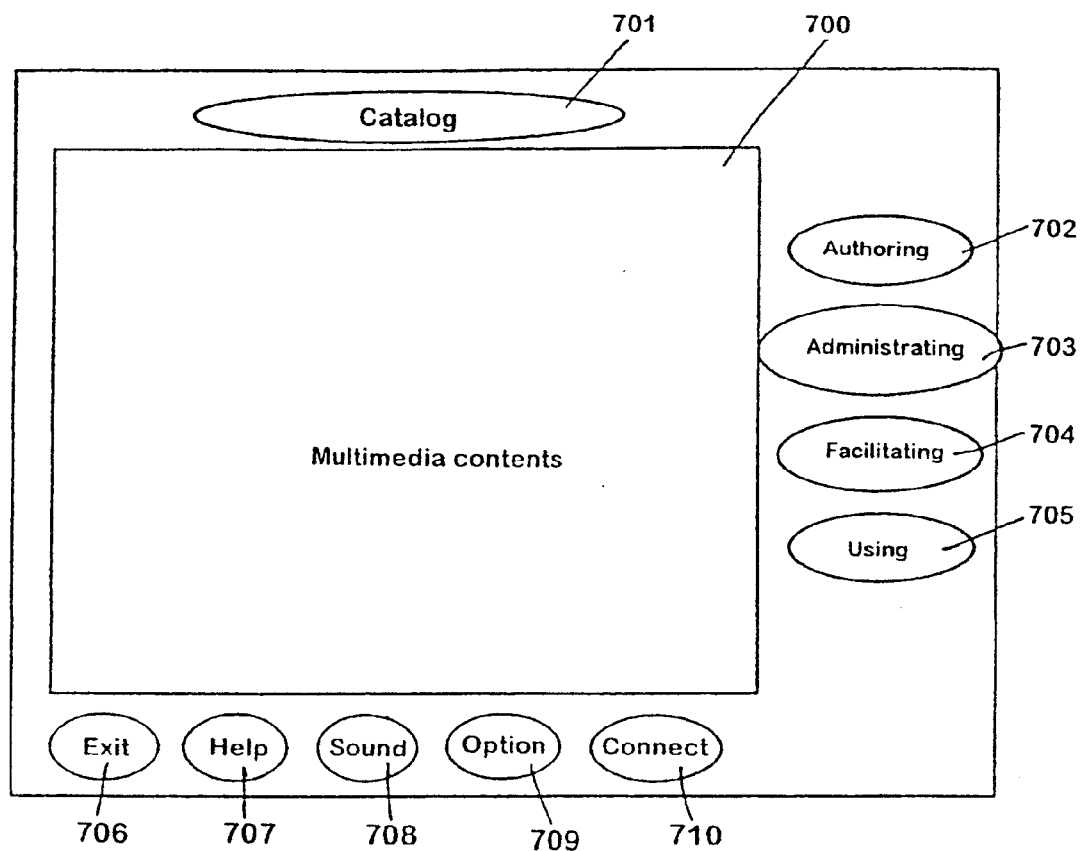

The invention shall now be explained in more detail referring to an execution example illustrated on the drawings, in which FIG. 1 illustrates a normal computer environment, which can be used when implementing the invention, FIG. 2 illustrates a flowchart of a normal educational system, where a user/server communication is used, FIG. 3 illustrates a flowchart of a user/in connection with implementation of the invention, FIG. 4 illustrates a flowchart of the most important sub elements, which according to the invention is included in the educational system, while FIG. 5 illustrates an example of a user interface in a display.

In FIG. 1 is an example of a computer system illustrated in a flowchart, which consists of a microprocessor 12, to which, by a bus 18, is connected storage's 14, 16 in the form of ROM-storage and RAM-storage. Furthermore, to the bus are connected a display 20, a speaker 22, a disc drive 24, a CD-ROM drive 26 and an input-and output device 28, which also is connected to a modem (not illustrated) or other type of communication device, for example for an Internet connection. Such systems is also known as multimedia systems and is in itself well-known, therefore not being further explained in more detail here.

In FIG. 2 is illustrated a normal computer based learning environment, which consists of a computer environment, such as a PC-environment 100, for example as the one illustrated on FIG. 1. This can be executed as illustrated in box 104. Afterwards, instructions can be selected by 106, which as illustrated schematically can consist in showing and retrieving instructions and data from a user computer, server computer or another type of sending device illustrated by 120, 121 or directly from the application and the user computer illustrated by 110, 111 and 112. Instructions and data can be printed, this means copied as illustrated in 122. A process, which can be continued as, illustrated by the backwards connection from box 122 to box 106.

In FIG. 3 is illustrated a flowchart of the elements included in the educational system according to the invention. This system is differentiated from the system illustrated in FIG. 2 by, containing the same elements as illustrated in FIG. 2 and also including other boxes according to the invention than the boxes illustrated in FIG. 2. Boxes, which in FIG. 2 start with reference, number 1, starts on FIG. 3 with 5.

Beside the in FIG. 2 illustrated boxes, the flowchart on FIG. 3, contains box 608, expressing the instruction sets which are specified by the supplier of an educational system. These instructions set can, as illustrated by 610, retrieve data related to the instructions, from both the user computers, server computers, such as a computer connected to the Internet, or other types of sending devices. Also the instruction sets can execute general or user specific instructions, illustrated by box 510, or retrieve instructions and data, illustrated by box 520 from the user computer, server computers or other type of sending devices.

The instruction set can control other instructions by box 611, both for finding and retrieving and showing instructions, possibly data, separated or together, related to general and customer specific educational systems, illustrated by 511 and 512, and showing contents from the data, possibly instructions, separated or together, which are found in 520, illustrated in box 521.

In the box 620 data, possibly instruction sets, can, 20 depending on the in 610 retrieved instruction data, be printed to external devices, illustrated in 622, such as a disc drive, a printer or alike, meaning the distributed object being copied.

The process continuous so that it is possible to retrieved and execute new instructions and distribute new data from the user computer, the server computer or other sending devices.

In FIG. 4 is illustrated in more detail how educational systems are being developed by a supplier. The system allows a supplier to develop and make it possible to execute an educational system, illustrated by 300, by choosing a number of topics illustrated in the boxes 310, 320, 330, 340, 350. The box 310 provides the supplier with the opportunity to choose instruction sets, being divided into topics, such as "overview map", illustrated by 311, "self-study" illustrated by 312, "lectures" illustrated by 313, "group collaboration" illustrated by 314, "browse" illustrated by 315 and "general instruction".

By suitable structuring of contents in these boxes, the overall structure of an educational system, according to the invention, is generated. For example, it is possible by box 312 to insert a multimedia document, an index, an appendix, etc. In box 313 it is for example possible to insert a video or a sound channel and possibly slides, create study groups, administer questions and answers between participants, and create lists of participants which are related to a lecture. By 314 it is possible to insert messages or slides, among other about study groups, and questions and answer between participants. By the box 315 it is possible to choose instructions, which connects the educational system and course contents to the Internet. In the next column, named 320, is illustrated an administration system divided into a number of sub functions, such as inserting and removing parts of a course. Also it is possible in box 322 to insert, edit and remove instructions, which are user related. In box 323 different administration data is handled, such as registration of the use of the educational system, payment etc.

In box 324 instructions related to questions for users, are administrated. Finally it is possible in box 325 to test and analyze user performance. Until now is mentioned those parts in FIG. 4 of the flowchart which relate to the actual development of an educational system using instruction sets, used by the supplier/author that develops the system.

It is possible to choose whether data and instructions shall be distributed together or separated, whether objects shall be executed from sending and/or receiving devices and also whether data and instructions shall be protected against being printed out and copied.

When executing the system, where one or more users are able to participate, the boxes 340 and 350 in FIG. 4 illustrate the more user specific part, used for the course. As seen, box 340 illustrates classifications into overview maps of, what among other is included in the course system, and as illustrated contents of boxes 341–346 are analogous to that found in boxes under 310, more specifically the boxes 311–316, except from box 340 being total or partly protected against editing and development of the educational system and course contents. When the system is used, there is by 350 illustrated a box for execution of the system.

After which in box 300 is illustrated choosing-courses, and hereafter in box 302 choose-the-instruction-sets. The boxes 351–355 are analog to the boxes 341–345. The difference between the boxes which are under 340, and the boxes which are under 350, is that the boxes under 350 totally or partly are protected from editing, developing and copying of the educational system and course contents, besides being totally or partly protected from use of instructions related to user performance.

For practical implementation on a computer, it is possible, as illustrated in FIG. 5, to create an overview map in which boxes 310, 320, 340 and 350 from FIG. 4 can be executed on the in FIG. 5. illustrated display. Besides this some help functions are illustrated in the same figure, which furthermore eases the use of the educational system according to the invention. The in FIG. 5 illustrated overview map shall only be understood as an example of a user interface. It is therefore possible, that the overview map contains other functions such as those represented by the boxes in FIG. 4.

What is claimed is:

1. A method of providing an educational object in a network of interconnected computing devices: comprising the steps of:

defining an instruction set related to an execution of the educational object;

defining associated data associated with said instruction set;

storing instruction sets in a first computing device of said interconnected computing devices; said instruction set comprising instructions for accessing said associated data and remote data not comprised in said associated data;

distributing said instruction set to at least a second computing device of said interconnected computing devices;

distributing said associated data to at least said second computing device;

storing, in said second computing device, said associated data;

executing, in the second computing device, the instruction set to provide the educational object such that instructions relating to accessing associated data results in access of said associated data stored in said second computing device, and instructions of said instruction set relating to accessing said remote data results in access of data through the network.

2. A method according to claim 1 wherein the method comprises the step of preventing copying of instructions of the instruction set if said instruction set includes a protect instruction.

3. A method as claimed in claim 1 wherein said instruction set is related to managing and execution of educational topics.

4. A method according to claim 1 wherein said associated data and instruction set is distributed to a third computing device.

5. A method as claimed in claim 1 wherein said associated data is limited to associated data related to static function expressions associated with an educational content.

6. A method according to claim 1 comprising the step of updating said associated data from said first computing device while executing the instruction set in the second computing device.

7. A method according to claim 1 wherein the method comprises the step of preventing copying of the associated data if said instruction set includes a protect instruction.

* * * * *